United States Patent

Spiess et al.

[11] Patent Number: 5,085,299
[45] Date of Patent: Feb. 4, 1992

[54] SHOCK ABSORBER WITH TWO SEAT VALVE

[75] Inventors: Ewald Spiess, Vaihingen/Enz 2; Michael Tischer, Abstatt, both of Fed. Rep. of Germany

[73] Assignee: Robert Bosch GmbH, Stuttgart, Fed. Rep. of Germany

[21] Appl. No.: 483,854

[22] Filed: Feb. 23, 1990

[30] Foreign Application Priority Data

May 26, 1989 [DE] Fed. Rep. of Germany ....... 3917064

[51] Int. Cl.5 .............................................. F16F 9/46
[52] U.S. Cl. .................................. 188/319; 188/322.15
[58] Field of Search .................. 188/299, 319, 322.22, 188/322.14, 322.15; 280/707, 714; 137/489, 493, 493.8, 493.9

[56] References Cited

U.S. PATENT DOCUMENTS

| | | | |
|---|---|---|---|
| 2,780,321 | 2/1957 | Sturari | 188/319 |
| 4,723,640 | 2/1988 | Beck | 280/714 X |
| 4,732,408 | 3/1988 | Ohlin | 188/299 X |
| 4,802,561 | 2/1989 | Knecht et al. | 188/299 X |
| 4,893,699 | 1/1990 | Engelsdorf et al. | 188/319 X |
| 4,907,680 | 3/1990 | Wolfe et al. | 188/299 |
| 4,973,854 | 11/1990 | Hummel | 188/299 X |

FOREIGN PATENT DOCUMENTS 1207706 10/1970 United Kingdom ................ 188/319

Primary Examiner—Robert J. Oberleitner
Attorney, Agent, or Firm—Edwin E. Greigg; Ronald E. Griegg

[57] ABSTRACT

A shock absorber which in an event of an electrical defect provides a predetermined throttle cross section which provides a pressure drop in the throttle cross section that determines damping of fluid flow from one work chamber to another work chamber. Thus, in an event of a defect in a control system, an arbitrarily selectable and preferably approximately average damping is produced.

16 Claims, 2 Drawing Sheets

SHOCK ABSORBER WITH TWO SEAT VALVE

RELATED PATENT APPLICATION

This application relates to co-pending application Ser. No. 07/390,042 filed Aug. 7, 1989.

BACKGROUND OF THE INVENTION

The invention is based on a shock absorber as defined hereinafter. A shock absorber is already the subject of an earlier patent application Ser. No. 07/390,042 filed Aug. 7, 1989 in which the damping action is variable by means of an electro-magnetic valve assembly. The valve assembly includes the valve body, which depending on the triggering of a magnet coil included in the valve assembly is adjusted variably far toward the valve seat.

In the shock absorber of the earlier application, if the valve body is adjusted forcefully toward the valve seat by a magnetic force of the magnet coil, then pronounced damping of the shock absorber is obtained. If the magnet coil adjusts the valve body toward the valve seat only with a slight magnetic force, then a slight damping of the shock absorber is obtained. Via the triggering of the magnet coil, the damping of the shock absorber can be set arbitrarily between a minimum and a maximum damping.

In the event of a defect, the magnet coil may lose all its current. In that case, with the shock absorber of the earlier application, minimum damping of the shock absorber is necessarily obtained. Although minimum damping by the shock absorber is surely necessary in some extreme situations, still in the case of a defect it is not an optimal compromise.

OBJECT AND SUMMARY OF THE INVENTION

By comparison, the shock absorber as defined herein has a further throttle passage, which has an advantage that in the event of a defect, a preselectable, preferably approximately average damping of the shock absorber is established. This damping established in the event of a defect is independent of the maximum and minimum damping.

From a manufacturing standpoint it is advantageous to provide a predetermined throttle cross section in the valve body.

To enable designing the valve body as simply as possible and as low in mass as possible, it is particularly advantageous to dispose the predetermined throttle cross section in the piston housing.

By building the valve into the predetermined throttle cross section, an arbitrarily selectable damping characteristic can be provided for the shock absorber even in the event of a defect.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
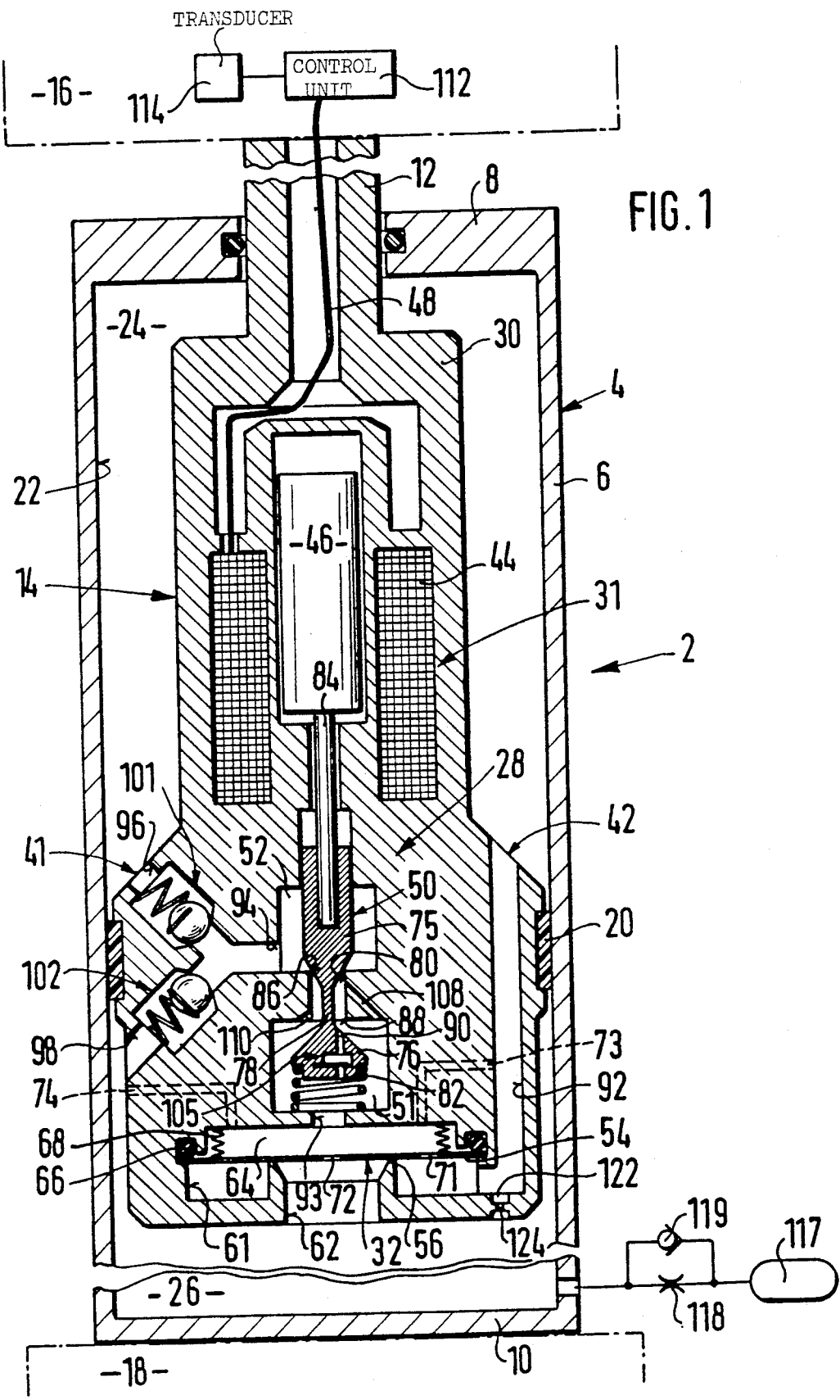
FIG. 1 shows a first exemplary embodiment of the invention, in simplified form.

FIG. 1 shows a first exemplary embodiment. A shock absorber 2 has a cylinder 4 with a jacket tube 6, shown in segments, having a first face end 8 and a second face end 10. A piston rod 12 protrudes from the first face end 8 of the jacket tube 6. Only the two ends of the piston rod 12 are shown. The piston rod 12 is connected by one end to a stepped damper piston 14 of larger diameter and by its other end it is pivotably connected to a first mass 16, represented by dot-dash lines. In other words, the damper piston 14 is connected to the first mass 16. The second face end 10 of the cylinder 4 is connected to a second mass 18, again shown in dot-dash lines. The first mass 16 is a vehicle body, for example, while the second mass 18 is for example a vehicle axle. The damper piston 14 may slide axially on an inner jacket face 22 of the jacket tube 6, via an interposed guide ring 20 which functions as a seal. An interior chamber of the cylinder 4 is divided by the damper piston 14 into a first work chamber 24 and a second work chamber 26. In the drawing, the first work chamber 24 is above the guide ring seal 20, and the second work chamber 26 is below the guide ring seal 20. The work chambers 24, 26 are at least partly filled with a pressure fluid.

At least one triggerable valve assembly 28 is integrated into the damper piston 14. The valve assembly 28 determines a pressure of the pressure fluid in at least one of the two work chambers 24, 26 and thus determines damping by the shock absorber.

The valve assembly 28 substantially comprises a piston housing 30 having a first single valve 31, a second single valve 32, a first flow connection 41 above the guide ring seal 20 and a second flow connection 42 below the guide ring seal 20. Both flow connections, 41, 42 connect the two work chambers 24, 26. The first flow connection 41 leads substantially through the first single valve 31, and the second flow connection 42 leads through the second single valve 32. A flow of pressure fluid that is exchanged between the two work chambers 24, 26, is divided into two partial flows. The first partial flow flows through the first flow connection 41, and the second partial flow flows through the second flow connection 42.

The first single valve 31 substantially comprises a magnet coil 44, an armature 46, a valve body 50 connected to or resting on the armature 46, a first pressure connection 51 and a second pressure connection 52. An electrical lead line 48 leads through the hollow piston rod 12 to the magnet coil 44.

The second single valve 32 substantially comprises a movable partition 54, a valve seat 56 provided on the piston housing 30, an annular first pressure chamber 61 that communicates with the first work chamber 24, a second pressure chamber 62 communicating with the second work chamber 26, a pressure space 64, and an elastic element 66 and/or a spring 68. A first restriction 71 in the movable partition 54 establishes communication between the first pressure chamber 61, the pressure space 64 and the first work chamber 24 via the pressure space 64. A further, second restriction 72 in the movable partition 54, establishes communication between the pressure space 64 and the second pressure chamber 62 and via the second pressure chamber with the second work chamber 26. The two restrictions 71, 72 may, however, be replaced by two restrictions 73, 74 shown in dashed lines and provided in the piston housing 30, but on the condition that the first restriction 71 or 73 connects the first work chamber 24 to the pressure space 64, while the second restriction 72 or 74 connects the pressure space 64 to the second work chamber 26. Each restriction 71, 72, 73, 74 has the function of a shutter or throttle.

The elastic element 66 in the exemplary embodiment shown is an elastomeric component, which among other functions is capable of sealing off the first pressure chamber 61 from the pressure space 64 at the outer circumference of the movable partition 54. Because it is never possible to exactly define a gap between the outer circumference of the movable partition 54 and the piston housing 30, given that the tolerances of the components are always variable, it is favorable for the elastic element 66 to have the function of a seal. If the seal is not necessary, then the spring 68 suffices. If the elastic element 66 and/or the movable partition 54 itself is elastic enough, then the spring 68 can be dispensed with.

The valve body 50 is divided into a first control part 75, a second control part 76 and a shaft 78 between the two control parts. The shaft 78 is smaller in diameter than the first control part 75 and smaller than the second control part 76. The first control part 75 of the valve body 50 is oriented toward the armature 46, and the second control part 76 is oriented away from the armature 46. The two control parts 75, 76 are frustoconical in shape, and the tips, which are not present but are conceivable, of the truncated cones of the two control parts 75, 76 point toward one another, while the truncated cones of the control parts 75, 76 adjoin the shaft 78 on both ends. The piston housing 30 has a step with an opening 80. The opening 80 of the step is smaller in diameter than the first control part 75 and the second control part 76 of the valve body 50, but larger than the diameter of the shaft 78. The valve body 50 is installed such that the first control part 75 is located on one side of the opening 80 and the second control part 76 is located on the other side of the opening 80. The first control part 75 is located substantially in the second pressure connection 52, and the second control part 76 is located substantially in the first pressure connection 51. A restoring spring 82 is disposed in the first pressure connection 51. The restoring spring 82 is supported on one end on the piston housing 30 and on another end acts upon the valve body 50.

The armature 46 can act upon the first control part 75 of the valve body 50 via a pin 84. Depending on the current to the magnet coil 44, the armature 46 and with it the first control part 75 of the valve body 50 is actuated with a variably great magnetic force in the direction toward a first valve seat 86, embodied at the transition from the second pressure connection 52 to the opening of the opening 80. The restoring spring 82 acts with a restoring force counter to the magnetic force of the magnet coil 44 upon the valve body 50, via the second control part 76. The restoring force of the restoring spring 82 tends to adjust the second control part 76 toward a second valve seat 88, embodied at the transition from the first pressure connection 51 to the opening 80 of the step. There is enough play between the first control part 75 of the valve body 50 and the piston housing 30 that a pressure of the pressure fluid prevailing in the second pressure connection 52 produces a force acting upon the valve body 50 and directed downward in the exemplary embodiment shown. A pressure prevailing in the first pressure connection 51 produces a force acting upon the valve body 50 and oriented upward in the exemplary embodiment shown. If the sum of the magnetic force of the magnet coil 44 plus the downwardly directed force is greater than the restoring force of the restoring spring 82 plus the upwardly directed force, then the first control part 75 rests with its conical side on the first valve seat 86. On the other hand, if the restoring force of the restoring spring 82 plus the upwardly directed force is greater than the magnetic force of the magnet coil 44 plus the downwardly directed force, then the second control part 76 rests with its conically embodied end on the second valve seat 88. If the second control part 76 of the valve body 50 is resting on the second valve seat 88, then there is no communication between the first pressure connection 51 and the second pressure connection 52, except for a predetermined throttle restriction 90 provided in the second control part 76 of the valve body 50. Other predetermined throttle restrictions 108, 110 that are alternatively possible instead of or in addition to the throttle restriction 90 are described later hereinafter.

A pressure in the first pressure chamber 61 and a pressure in the second pressure chamber 62 together form an opening force that acts upon the movable partition 54, with the tendency to lift the movable partition 54 from the valve seat 56. A pressure in the pressure space 64, a force of the spring 68, a force of the elastic element 66, and if the movable partition 54 is under tension a prestressing force present in the partition 54 acts as a closing force in the opposite direction upon the movable partition 54, with the tendency to actuate the movable partition 54 toward the valve seat 56. Depending on the magnitude of the closing force and opening force, the movable partition 54 lifts more or less far from the valve seat 56.

The second flow connection 42 connects the two work chambers 24, 26 and leads through the first pressure chamber 61, the second pressure chamber 62 and at least one opening 92 in the piston housing 30. The at least one opening 92 connects the first work chamber 24 to the first pressure chamber 61. If the movable partition 54 lifts from the valve seat 56, then a communication exists between the first pressure chamber 61 and the second pressure chamber 62 through a gap between the movable partition 54 and the valve seat 56, and the second flow connection 42 is opened to a variable extent. Since the restrictions 71, 72, 73, 74 are relatively small, only a small portion of the pressure fluid can flow through these restrictions even under high pressure.

Via a second opening 93 in a step of the piston housing 30 between the pressure space 64 and the first pressure connection 51, the pressure space 64 communicates continuously with the first pressure connection 51. A virtually equal pressure prevails in the pressure space 64 and in the first pressure connection 51.

The second flow connection 42 leads out of the first work chamber 24 through the opening 92, the first restriction 71 and/or the first restriction 73 into the pressure space 64 or out of the second work chamber 26 through the second pressure chamber 62 and the second restriction 72 and/or the second restriction 74 into the pressure space 64. From the pressure space 64, the first flow connection 41 leads through the opening 93 into the first pressure connection 51, then through the opening 80 in the step into the second pressure connection 52 and into a conduit 94. From the conduit 94, the first flow connection 41 branches into a further conduit 96, by way of which the first flow connection 41 discharges into the first work chamber 24. However, from the conduit 94 the first flow connection 41 also branches off into a further conduit 98, which discharges into the second work chamber 26. A first one-way check valve 101 is provided in the conduit 96. The first check valve 101 is disposed in the conduit 96 in such a way that the pressure fluid can flow out of the second pressure connection 52 through the conduit 96 toward the first work chamber 24, but a flow in the reverse direction is not possible. A second one-way check valve 102 is provided in the conduit of the first flow connection 41, disposed such that the pressure fluid can flow only in one direction out of the second pressure connection 52 through the conduit 94 and the conduit 98 into the second work chamber 26.

If there is a pressure difference between the first work chamber 24 and the second work chamber 26, then the pressure fluid attempts to flow through the damper piston 14 having the valve assembly 28 from one work chamber 24 or 26 into the respective other work chamber. The pressure difference may for instance arise upon a relative motion between the damper piston 14 and the cylinder 4.

If there is a pressure difference between the two work chambers 24, 26, the first partial flow of the pressure fluid flows through the first flow connection 41 out of one of the two work chambers 24, 26 into the respective other work chamber. Even if a relatively large flow of pressure fluid is exchanged between the two work chambers 24, 26, the first partial flow is still relatively small, and the predominant portion of the pressure fluid flow flows as a second partial flow through the second flow connection 42. The two check valves 101, 102 are advantageously only slightly prestressed, and thus present only slight resistance to the relatively small first partial flow, and so the pressure in the second pressure connection 52 is no greater, or virtually no greater, than the pressure in one of the two work chambers 24 or 26, in which the lower pressure prevails. If there is a pressure difference between the two work chambers 24, 26, then some of the pressure fluid flows through the first restriction 71, 73 and through the second restriction 72, 74. This means a pressure drop at the first restriction 71, 73 as well as a pressure drop at the second restriction 72, 74. It further means that if the pressure in the first work chamber 24 is greater than in the second work chamber 26, then the pressure in the pressure space 64 is greater than that in the second work chamber 26 but less than that in the first work chamber 24. If the pressure in the second work chamber 26 is greater than that in the first work chamber 24, then because of the pressure drop at the two restrictions 71, 72 or 73, 74, the pressure in the pressure space 64 is greater than the pressure in the first work chamber 24 but simultaneously less than the pressure in the second work chamber 26. This means that given a pressure difference between the pressures in the two work chambers 24 and 26, the pressure in the pressure space 64 and hence the pressure in the first pressure connection 51 is greater than the pressure in the second pressure connection 52.

In the remainder of this description, a distinction will be made between two operating states of the shock absorber. In the first operating state, regular operation, the magnet coil 44 of the first single valve 31 has current through it, such that the first control part 75 of the valve body 50 is pressed to a variable extent against the first valve seat 86. In the second operating state, in the event of a defect in the electrical lead line 48 or because of inadequate current through the magnet coil 44, for example, the sum of the restoring force of the restoring spring 82 plus the upwardly directed force of the pressure in the first pressure connection 51 predominates and presses the second control part 76 of the valve body 50 against the second valve seat 88.

Since in the first operating state an equilibrium exists between the sum of the magnetic force of the magnet coil 44 plus the downwardly directed force and the sum of the restoring force of the restoring spring 82 plus the upwardly directed force of the pressure prevailing in the first pressure connection 51, the pressure in the first pressure connection 51 can be controlled via the magnetic force and thus by supplying a variably intense current to the magnet coil 44. Because of the equilibrium between the closing force prevailing at the movable partition 54 and the opening force prevailing there, with the pressure in the pressure space 64 influencing the closing force, the motion of the movable partition 54 can be controlled via the pressure in the pressure space 64 and thus via the pressure in the first pressure connection 51, and hence via the magnetic force or in other words via the current to the magnet coil 44. If the pressure in the first work chamber 24 is greater than in the second work chamber 26, then the pressure in the first pressure chamber 61 attempts to lift the movable partition 54 from the valve seat 56. Since the pressure in the first pressure chamber 61 participates in the opening force, it is possible, because of the equilibrium between the opening force and the closing force, to control the pressure in the first pressure chamber 61 and thus the pressure in the first work chamber 24 via the pressure in the pressure space 64. If the pressure in the second work chamber 26 is greater than in the first work chamber 24, then the situation is equivalent, and via the pressure in the pressure space 64 or via the current to the magnet coil 44, the pressure in the second work chamber 26 can be controlled.

The pressure in the first pressure chamber 61, that is, in the first work chamber 24, and the pressure in the second pressure chamber 62, or in other words in the second work chamber 26, participate in the opening force acting upon the movable partition 54. For reasons of equilibrium, action can thus be exerted upon the pressures in the work chambers 24, 26 by means of the magnetic force of the magnet coil 44, via the pressure in the first pressure connection 51 and via the pressure in the pressure space 64. This means that the pressure difference between the two work chambers 24, 26 can be controlled as a function of the triggering of the magnet coil 44.

The pressure difference between the two work chambers 24, 26 determines the damping of the shock absorber. A particular advantage of this shock absorber is that the pressure difference and thus the damping depends substantially on the magnetic force and hence on the current to the magnet coil 44, and does not depend, or virtually does not depend, on the magnitude of the pressure fluid flow, or in other words on the relative speed between the damper piston 14 and the cylinder 4.

In the second operating state, as noted above, the second control part 76 of the valve body 50 rests on the second valve seat 88 of the piston housing 30. In the second operating state, the magnetic force of the magnet coil 44 no longer has any influence on the pressure in the pressure space 64 and hence on the pressure in the work chambers 24, 26. In the second operating state, the first control part 75 of the valve body 50 has lifted completely from the first valve seat 86. The first partial flow of pressure fluid flowing through the first flow connection 41 flows, in the second operating, through the predetermined throttle restriction in the second control part 76 of the valve body 50. By way of the pressure drop of the first partial flow flowing through the predetermined throttle restriction 90, the pressure in the first pressure connection 51 and hence the pressure in the pressure space 64 and thus the pressure in the work chambers 24, 26 can be determined.

The predetermined throttle restriction 90 can be embodied in various ways. For instance, it may be a simple bore; it may also, however, include a valve 105, for instance a pressure limiting valve. In the drawing, the predetermined throttle restriction 90 includes a plate valve that is simple to manufacture as an example of the valve 105; this valve opens at a predetermined pressure and provides for a relatively constant pressure drop at the predetermined throttle restriction.

In addition to the predetermined throttle restriction 90 or instead of the predetermined throttle restriction 90 in the valve body 50, a predetermined throttle restriction 108 may also be provided inside the piston housing 30. The predetermined throttle restriction 108 is provided such that in the first operating state, there is no communication through this predetermined throttle restriction 108 between the first pressure connection 51 and the second pressure connection 52. In the second operating state, when the second control part 76 of the valve body 50 is resting on the second valve seat 88, communication exists from the first pressure connection 51 to the second pressure connection 52 through the predetermined throttle restriction 108.

In the exemplary embodiment shown, the predetermined throttle restriction 108 is a simple bore; however, it may also be provided with a valve 105, just like the other predetermined throttle restriction 90.

In addition to or instead of the two predetermined throttle restrictions 90, 108, the valve assembly 28 may be provided with a predetermined throttle restriction 110. The predetermined throttle restriction 110 is an arbitrarily embodied, simple-to-make notch on the second valve seat 88 of the piston housing 30.

Since the second control valve 76 is lifted far away from the second valve seat 88 in the first operating state, the predetermined throttle restrictions 90, 108, 110 have no influence on the damping in the first operating state. In the second operating state, the first control part 75 of the valve body 50 is far away from the first valve seat 86. In the second operating state, the second control part 76 of the valve body 50 rests on the second valve seat 88, and the first partial flow is throttled by the predetermined throttle restriction 90, 108, 110.

The exemplary embodiment shown is provided merely by way of example with the three predetermined throttle restrictions 90, 108, 110. Normally, the valve assembly 28 will be equipped with only one of these predetermined throttle restrictions 90, 108, 110.

The shock absorber according to the invention has a number of advantages: In the shock absorber having the valve assembly 28, it is possible by suitable dimensioning to provide that only a small portion, or in other words a small first partial flow of the pressure fluid being exchanged between the two work chambers 24, 26 flows through the first flow connection 41, while the much larger portion of the pressure fluid, in other words a large second partial flow, is exchanged through the second flow connection 42. Small cross-sectional areas can therefore be selected for conduits 94, 96, 98. The check valves 101, 102 and the two pressure connections 51, 52 can also be made with small dimensions as a result. This makes it possible to select a relatively small valve body 50 and a small armature 46, which is actuated by a relatively small magnet coil 44. Since only a small proportion, that is, the first partial flow of the pressure fluid, flows through the first single valve 31, the valve body 50 needs to execute only a relative short stroke in the first operating state. Because only relatively small forces are required to actuate the valve body 50, and because of the short stroke, it is relatively easy to actuate the valve body 50 with a relatively fast reaction time. The size of the first partial flow of pressure fluid that flows through the first flow connection 41 and thus through the first single valve 31 is substantially dependent on the size of the restrictions 71, 72, 73, 74. The restrictions 71, 72, 73, 74 can be selected to be rather small, but should not be selected to be so small that any particles of dirt in the pressure fluid could be trapped in the restrictions 71, 72, 73, 74.

In the exemplary embodiment shown, the pressure in the pressure space 64 increases with increasing magnetic force. If the magnet coil 44 is a proportional magnet, then the pressure in the pressure space 64 and hence the damping is directly proportional to a trigger current that is supplied from a control unit 112 through the line 48 to the magnet coil 44.

By means of a transducer 114, the trigger current for the magnet coil 44 and thus the damping of the shock absorber 2 can be adjusted via the control unit 112, in the first operating state. The transducer 114 may for example be a sensor and/or a manual lever, or the like.

If the shock absorber is equipped in accordance with the invention with the second valve seat 88 and at least one of the predetermined throttle restrictions 90, 108, 110, then the shock absorber 2 can advantageously be embodied such that the damping is variable within very wide limits in the first operating state, without having to fear the establishment of an undesirable and possibly even dangerous extreme damping in the event of a defect.

When the piston rod 12 is driven into the cylinder 4, some of the pressure fluid is positively displaced out of the cylinder 4, as a function of the cross section of the piston rod. When the piston rod 12 is retracted from the cylinder 4, pressure medium should be capable of flowing back into the cylinder 4. For this purpose, the second work chamber 26 communicates with a compensation chamber 117. To enable generating a relatively high pressure in the second work chamber 26 and hence a relatively strong damping even when the pressure in the compensation chamber 117 is relatively low, a throttle 118 is installed between the compensation chamber 117 and the second work chamber 26. When the pressure fluid flows back out of the compensation chamber 117 into the second work chamber 26, the throttle 118 is unnecessary, and for this reason a one-way check valve 119 is disposed parallel to this throttle 118. The check valve 119 is installed such that the pressure medium can flow through the check valve 119 only when the flow direction is out of the compensation chamber 117 into the work chamber 26. The compensation chamber 117 may for instance be a gas-filled pressure reservoir. If the pressure in the compensation chamber 117 is sufficiently high, the throttle 118 and the check valve 119 can also be dispensed with.

To assure that the volume of pressure fluid positively displaced in one of the work chambers 24, 26 is equal to the volume flowing into the other work chamber when there is a relative motion between the damper piston 14 and the jacket tube 6, a double piston rod 12 may be used that protrudes from both ends of the damper piston 14, out of the face ends 8, 10 of the cylinder 4. It is particularly favorable if both ends of the double piston rod 12 have approximately the same diameter.

The predetermined throttle restriction 90, 108, 110 that is effective in the event of an electrical defect can be selected arbitrarily. This makes it possible to embody the shock absorber such that an average damping is established, for example, in the event of an electrical defect. This avoids extreme situations in the event of an electrical defect.

For the sake of simplicity, the piston housing 30 is shown in the drawing as if it were made in one piece. However, to enable mounting of the magnet coil 44, the restoring spring 82, the valve body 50 and the movable partition 54, for example, it is necessary to make the piston housing 30 in a plurality of pieces and to join them later, which is familiar to anyone skilled in the art. The valve body 50, shown in one piece in the drawing, could also be assembled from multiple parts.

Besides the flow connections 41, 42, the damper piston 14 may also be provided with at least one further flow connection 122 in the lower end thereof. A variable or constant throttle or shutter 124 may for instance be located in this further flow connection 122.

In the exemplary embodiment shown, the valve assembly 28 with the flow connections 41, 42 and the further flow connection 122 are disposed in the damper piston 14. However, it is also possible to dispose the valve assembly 28 with the first flow connection 41 and the second flow connection 42 and/or the further flow connection 122 and/or further flow connections outside the damper piston 14, for instance on an outside surface of the jacket tube 6 of the cylinder 4, or on some partition, not shown, inside the cylinder 4.

A single-tube shock absorber has been selected as an exemplary embodiment of the shock absorber according to the invention. This is merely an example, however. The shock absorber could equally well be a so-called double-tube shock absorber.

As indicated above, the valve assembly 28 includes the first single valve 31 and the second single valve 32. The second single valve 32 includes the movable partition 54. In the exemplary embodiment shown, the movable partition is a thin diaphragm of metal or plastic. However, instead of comprising the diaphragm the movable partition 54 may comprise two axially movable pistons that are actuated by two springs each toward a respective stop, as is shown in FIG. 1 of Ser. No. 07/390,042 filed Aug. 7, 1989. In the exemplary embodiment shown there, the first flow connection includes four check valves. That is possible in the present case as well.

Figure 2:
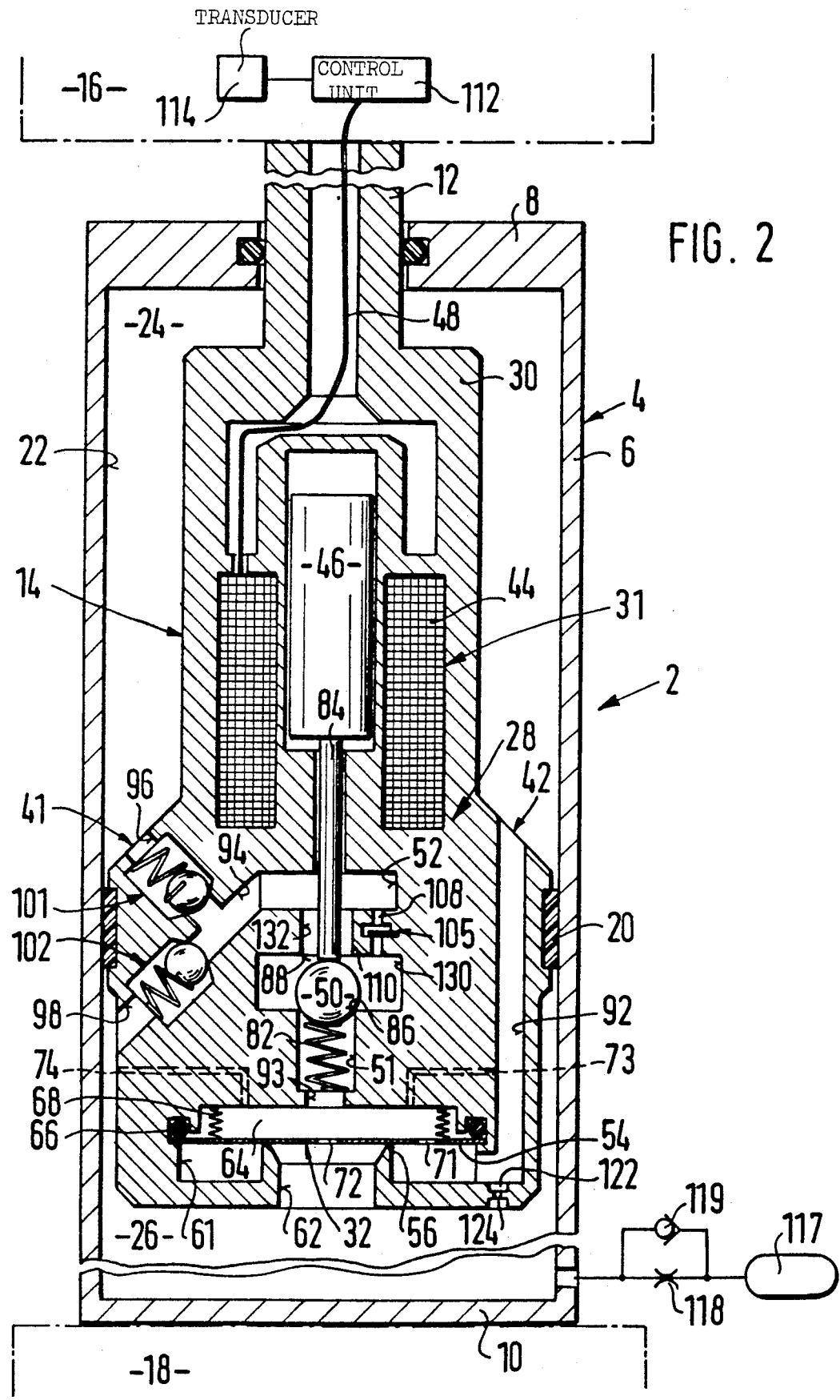
FIG. 2 shows a second embodiment, again in simplified form.

The movable partition 54 embodied in the form of a thin diaphragm may also, however, be embodied in the form of a stepped piston that is actuated by a spring toward a valve seat, as shown in FIG. 2 of copending application.

FIG. 2 shows a second exemplary embodiment. In FIGS. 1 and 2, elements that are identical or function the same are identified by the same reference numerals. The shock absorber of the second exemplary embodiment substantially comprises the same elements as the shock absorber of the first exemplary embodiment.

The valve body 50 of the first exemplary embodiment is substantially a rotationally symmetrical, elongated member divided into a plurality of segments. The valve body 50 of the second exemplary embodiment is located at least partly inside a valve chamber 130. The first pressure connection 51 merges, on the side remote from the opening 93 at an edge, with the valve chamber 130. The diameter of the first pressure connection 51 is less than the diameter of the valve body 50. The diameter of the valve chamber 130 is larger than the diameter of the valve body 50. The edge of the transition from the first pressure connection 51 to the valve chamber 130 forms the first valve seat 86. On its end remote from the first pressure connection 51, the valve chamber 130 merges with an opening 132. The opening 132 has a smaller diameter than the spherical valve body 50. The transition from the valve chamber 130 to the opening 132 forms the second valve seat 88. On the end remote from the valve chamber 130, the opening 132 merges with the second pressure connection 52. The predetermined throttle restriction 108 is provided in the piston housing 30 parallel to the opening 132. This restriction joins the valve chamber 130 to the second pressure connection 52.

The distance between the second valve seat 88 and the first valve seat 86 is large enough that there is sufficient space for the stroke of the valve body 50. In the first operating state, just as in the first exemplary embodiment, the valve body 50 is moved to a variable extent toward the first valve seat 86 by the magnetic force of the magnet coil 44, via the armature 46 and via the pin 84.

In the second operating state, again as in the first exemplary embodiment, the valve body 50 is moved toward the valve seat 88. This precludes a flow of pressure fluid out of the first pressure connection 51 into the second pressure connection 52 through the valve chamber 130 and through the opening 132. However, the pressure fluid can flow out of the first pressure connection 51 into the second pressure connection 52 through the valve chamber 130 and through the predetermined throttle restriction 108. Thus in the second exemplary embodiment of 52 as well, the damping of the shock absorber is determined in the second operating state by the predetermined throttle restriction 108.

Otherwise, the functioning of the shock absorber of the second exemplary embodiment is the same as that of the shock absorber of the first exemplary embodiment.

It is understood that in the second exemplary embodiment of FIG. 2 as well, the predetermined throttle restriction may be provided in addition to or instead of the predetermined throttle restriction 108 in the vicinity of the second valve seat 88. However, it is also possible, instead of or in addition to the predetermined throttle restrictions 108, 110, to provide the predetermined throttle restriction 90 inside the valve body 50. However, this is not shown in the second exemplary embodiment in FIG. 2, for the sake of simplicity. If the predetermined throttle restriction 90 is provided inside the valve body 50, then a torsion-preventing means must be provided to assure that when the valve body 50 is resting on the second valve seat 88, the predetermined throttle restriction 90 is aligned in such a way that a communication exists via this throttle restriction from the first pressure connection 51 to the second pressure connection 52.

The foregoing relates to preferred exemplary embodiments of the invention, it being understood that other variants and embodiments thereof are possible within the spirit and scope of the invention, the latter being defined by the dependent claims.

What is claimed and desired to be secured by Letters Patent of the United States is:

1. A shock absorber, which comprises a cylinder, a damper piston displaceable in said cylinder, said damper piston dividing said cylinder into first and second work chambers, at least one valve assembly which determines a pressure of a pressure fluid in one of said first and second work chambers, said valve assembly including a valve body, a restoring force means, a first valve seat and a second valve seat, and control means for operating said valve body, said valve body includes a first valve operative relative to said first valve seat and a second valve operative relative to said second valve seat, a predetermined throttle restriction, said first valve being normally adjustable toward said first valve seat by said control means, and in an event of a defect to said control means, said second valve is forced against said second valve seat (88) by said restoring force means, and in that case, fluid under pressure can flow through said predetermined throttle restriction (90, 108, 110).

2. A shock absorber as defined by claim 1, in which said predetermined throttle restriction (90, 108, 110) is provided in said valve body (50).

3. A shock absorber as defined by claim 2, which includes a valve (105) in said predetermined throttle restriction (90, 108).

4. A shock absorber as defined by claim 3, in which said predetermined throttle restriction (110) is a notch provided in the second valve seat (88).

5. A shock absorber as defined by claim 2, in which said predetermined throttle restriction (110) is a notch provided in the second valve seat (88).

6. A shock absorber as defined by claim 1, in which said predetermined throttle restriction (90) is provided in said damper piston (14).

7. A shock absorber as defined by claim 6, which includes a valve (105) in said predetermined throttle restriction (90, 108).

8. A shock absorber as defined by claim 7, in which said predetermined throttle restriction (110) is a notch provided in the second valve seat (88).

9. A shock absorber as defined by claim 6, in which said predetermined throttle restriction (110) is a notch provided in the second valve seat (88).

10. A shock absorber as defined by claim 1, which includes a valve (105) in said predetermined throttle restriction (90, 108).

11. A shock absorber as defined by claim 10, in which said predetermined throttle restriction (110) is a notch provided in the second valve seat (88).

12. A shock absorber as defined by claim 1, in which said predetermined throttle restriction (110) is a notch provided in the second valve seat (88).

13. A shock absorber as defined by claim 1, which contains a pressure fluid in each of said work chambers (24, 26).

14. A shock absorber as defined by claim 13, which includes a compensation chamber connected to one of said work chambers.

15. A shock absorber as defined by claim 14, which includes a damper in a connection line between said one work chamber and said compensation chamber.

16. A shock absorber as defined by claim 15, which includes a one-way valve by-pass in parallel with said damper.

* * * * *